April 7, 1942.    J. L. DRAKE ET AL    2,279,112
PRESSING APPARATUS
Filed May 28, 1937    2 Sheets-Sheet 1
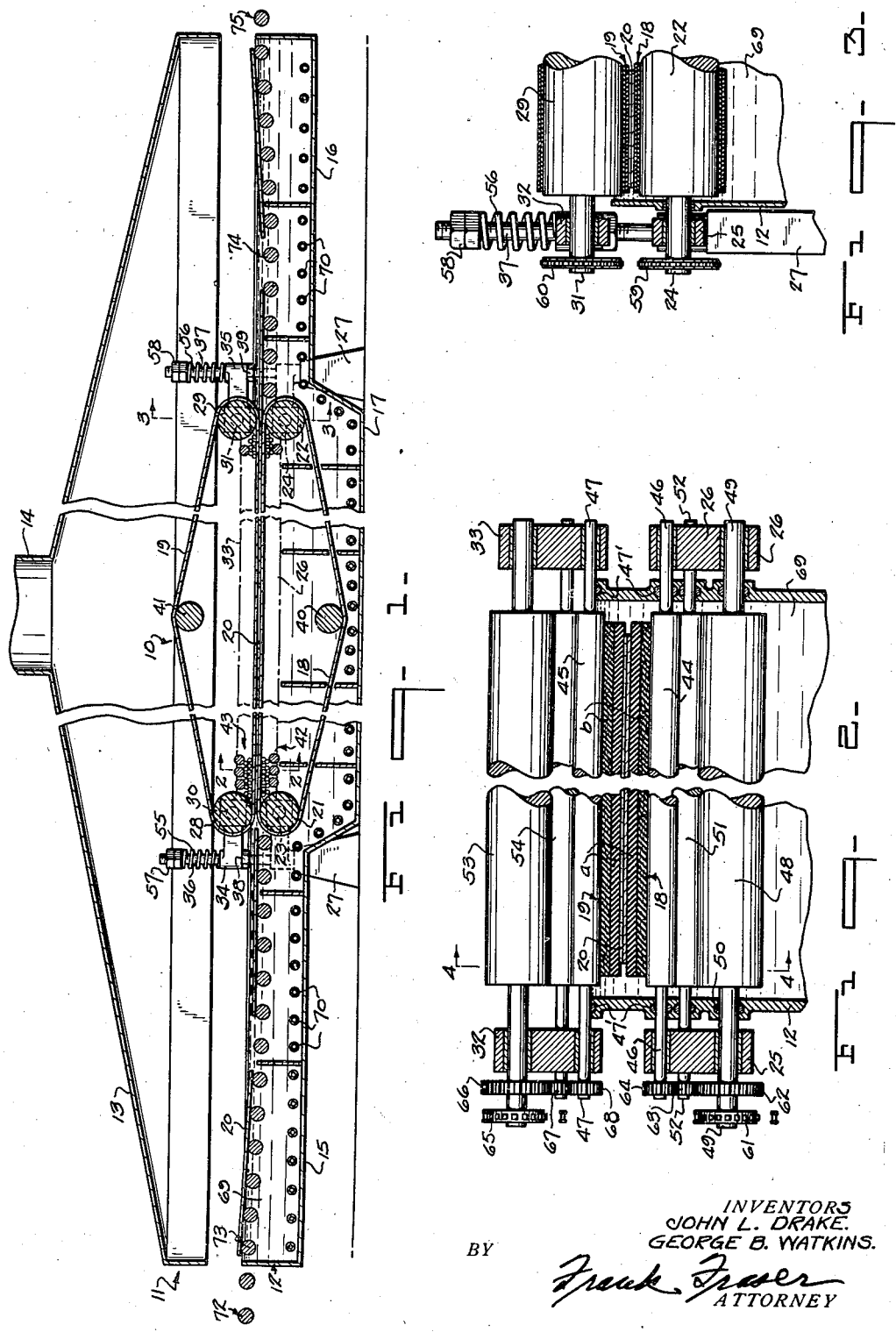
INVENTORS
JOHN L. DRAKE.
GEORGE B. WATKINS.
BY Frank Fraser
ATTORNEY April 7, 1942.  J. L. DRAKE ET AL  2,279,112
PRESSING APPARATUS
Filed May 28, 1937  2 Sheets-Sheet 2
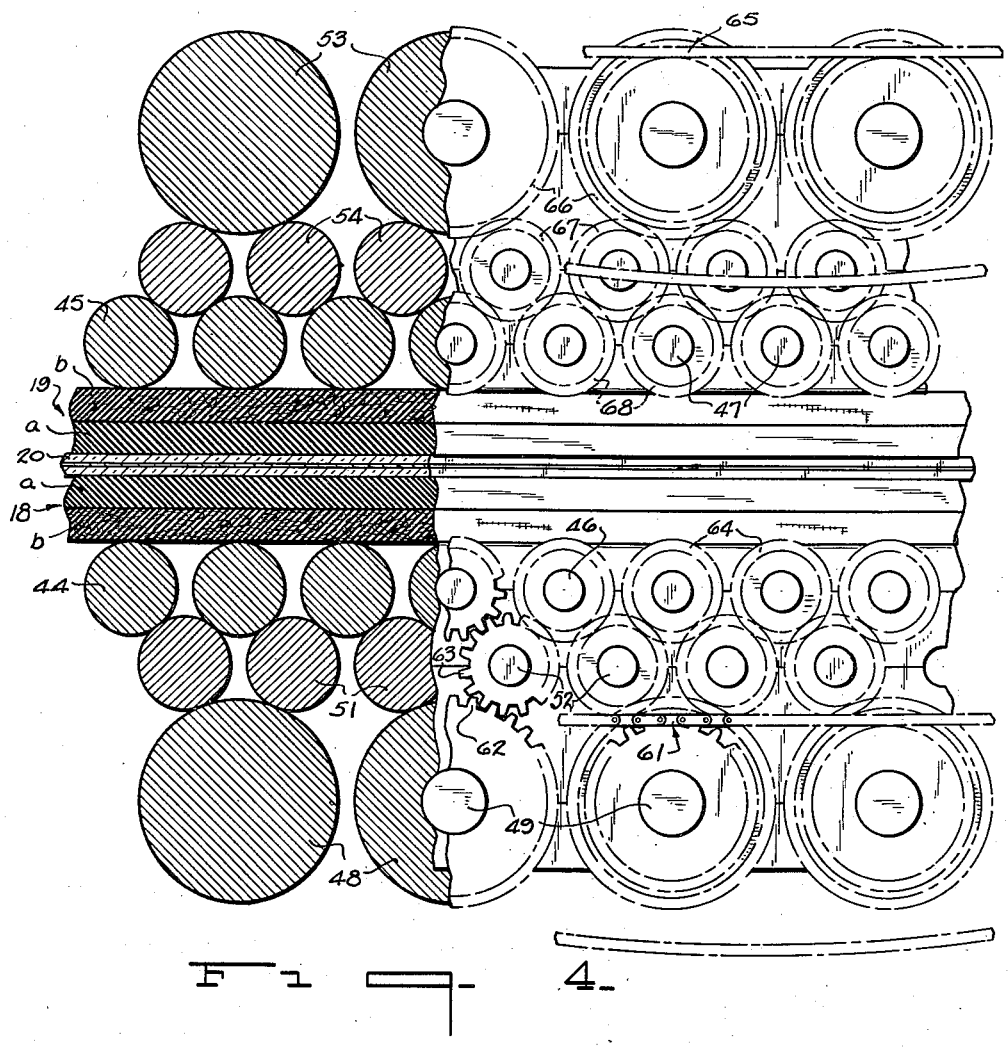
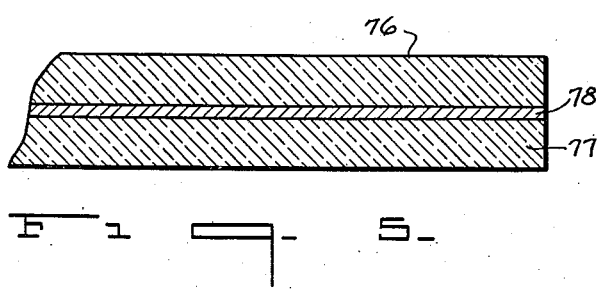
INVENTORS
JOHN L. DRAKE.
GEORGE B. WATKINS.
BY Frank Fraser
ATTORNEY Patented Apr. 7, 1942

2,279,112

UNITED STATES PATENT OFFICE 2,279,112

PRESSING APPARATUS

John L. Drake and George B. Watkins, Toledo, Ohio, assignors to Libbey-Owens-Ford Glass Company, Toledo, Ohio, a corporation of Ohio Application May 28, 1937, Serial No. 145,228

3 Claims. (Cl. 18—17)

The present invention relates to the manufacture of laminated safety glass and more particularly to an improved pressing apparatus for use in the compositing of the laminations.

Generally speaking, laminated safety glass comprises two or more sheets of glass and one or more non-brittle membranes or plastic sheets all bonded together to form a composite structure. In manufacturing this type of safety glass, it is customary to first assemble the various laminations in proper superimposed relationship, after which they are bonded together by subjecting the glass-plastic sandwich to the action of heat and pressure.

According to one method of manufacture, an ordinary roll type press is used for this purpose. However, in using such a construction for bonding laminated safety glass, considerable difficulty is encountered because of the unequal distribution of pressure on the sandwich as it passes between the rolls, which unequal pressure results in a flexing of the glass sheets. Further, since this flexing action is accentuated with increased plasticity of the plastic used, it will be apparent that with the advent of softer plastics, particularly those made from the vinyl type of resin such as Formvar, Alvar, and Butylvar, the difficulty is even more pronounced because of the greater plasticity or lack of rigidity of these resin type plastics.

It is therefore an important object of the present invention to provide a pressing apparatus of novel and improved construction wherein the assembled laminations forming the glass-plastic sandwich may be rapidly and efficiently bonded together in a continuous manner by roll pressure and wherein the pressure applied to opposite surfaces of the sandwich will be distributed uniformly throughout their entire areas, thereby minimizing, if not entirely preventing, flexing of the glass sheets during the pressing thereof.

Another object of the invention is the provision of apparatus of the above character wherein the pressing of the glass-plastic sandwich is effected by passing it between a plurality of pairs of relatively small pressure rolls which are positioned relatively close together and wherein compressible cushions or pads are arranged between the pressure rolls and glass-plastic sandwich to distribute the pressure exerted by said rolls uniformly throughout the opposite surface areas of said sandwich.

Still another object of the invention is the provision, in apparatus of the above character, of novel means for preventing the bending or distortion of the small pressure rolls and consequent bending of the glass sheets.

Other objects and advantages of the invention will become more apparent during the course of the following description when taken in connection with the accompanying drawings.

In the drawings wherein like numerals are employed to designate like parts throughout the same:

Fig. 1 is a longitudinal vertical sectional view through an apparatus constructed in accordance with the present invention;

Fig. 2 is a transverse vertical sectional view taken substantially on line 2—2 in Fig. 1;

Fig. 3 is a fragmentary vertical sectional view taken substantially on line 3—3 in Fig. 1;

Fig. 4 is a fragmentary view partially in section, taken substantially on line 4—4 in Fig. 2; and Fig. 5 is a fragmentary sectional view of a finished sheet of laminated safety glass.

Referring now more particularly to the drawings, the preferred form of pressure apparatus herein provided for carrying out the present invention includes an improved type of roll press designated in its entirety by the numeral 10 and which is housed within a suitable enclosure 11. The enclosure 11 comprises a rectangular tank 12 and a hood or cover 13 arranged thereabove and provided centrally thereof with a stack 14. The tank 12 is preferably formed with relatively shallow portions 15 and 16 at its opposite ends and a relatively deeper intermediate or middle portion 17 with which the press 10 is associated.

The press 10 includes a pair of horizontally arranged, superimposed, endless belts 18 and 19 between which the glass-plastic sandwiches 20 are adapted to move during the pressing operation. The lower belt 18 is trained about spaced drums 21 and 22 keyed to shafts 23 and 24 respectively, the opposite ends of said shafts extending through suitable packing glands in the opposite side walls of the tank 12 and being journaled in elongated bearing blocks 25 and 26 which are mounted upon piers or the like 27.

The upper belt 19 is trained about a second pair of spaced drums 28 and 29, located above the drums 21 and 22 and mounted upon shafts 30 and 31 respectively, journaled at their opposite ends in elongated bearing blocks 32 and 33. The bearing blocks 32 and 33 are arranged directly above bearing blocks 25 and 26, and are provided with bosses 34 and 35 respectively having vertical openings therein to receive threaded vertical rods 36 and 37 which are rigidly secured to the blocks 25 and 26 and extend upwardly therefrom. The bearing blocks 32 and 33 are thus vertically movable relative to the bearing blocks 35 and 36, being limited in their downward movement by stop nuts 38 and 39 threaded upon the rods 36 and 37. Suitable tighteners 40 and 41 are provided for the belts 18 and 19 respectively and these tighteners also serve to maintain the loops of the belts open as shown in Fig. 1.

In order to support the glass-plastic sandwiches as they move between the belts 18 and 19 and to simultaneously apply pressure thereto, there is provided the oppositely disposed roll assemblies 42 and 43 associated with the belts 18 and 19 respectively. The lower roll assembly 42 is positioned within the loop of the lower belt 18 and is adapted to support the upper run thereof while the upper roll assembly 43 is arranged within the loop of the upper belt 19 and engages the lower run thereof.

The roll assemblies 42 and 43 include a plurality of relatively small, horizontally aligned pressure rolls 44 and 45 respectively which are provided with the respective stub shafts 46 and 47. The ends of these stub shafts extend through packing glands 47' in the side walls of the tank 12, the shafts 46 of the rolls 44 being journaled in the bearing blocks 25 and 26 while the shafts 47 of the rolls 45 are journaled in the bearing blocks 32 and 33. As best shown in Fig. 4, the individual pressure rolls of each of the roll assemblies 42 and 43 are positioned as close together as is practicable without their being in actual contact with one another and each of the rolls 44 of the lower assembly 42 is arranged directly below a corresponding roll 45 of the upper assembly 43 and is adapted to coact therewith, thus providing a plurality of closely spaced pairs of oppositely disposed pressure rolls between which the glass-plastic sandwiches 20 are pressed.

As set forth above, the pressure rolls 44 and 45 are preferably made relatively small, for example about one inch in diameter, and this permits the positioning of the pressure rolls to exert pressure along closely spaced transverse lines for the purpose of providing a more nearly continuous pressing surface. In order to prevent any tendency of the rolls themselves to bend during use and which would result in an unequal distribution of pressure transversely of the sandwiches, the present invention contemplates the provision of relatively large backing up rolls associated with the small pressure rolls of each roll assembly in a manner to prevent the bending or distortion of these pressure rolls. Thus, the lower roll assembly 42 includes a plurality of backing up rolls 48 provided with stub shafts 49, the opposite ends of which shafts pass through packing glands 50 in the side walls of the tank 12 and are journaled in the bearing blocks 25 and 26.

To permit the use of relatively large backing up rolls in combination with relatively small, closely spaced pressure rolls, there is provided a plurality of intermediate rolls 51 arranged between the pressure rolls 44 and the backing up rolls 48. These intermediate rolls 51 are preferably of substantially the same size as the pressure rolls 44 and are mounted in a similar manner, being provided with stub shafts 52 passing through packing glands in the side walls of the tank 12 and journaled in the bearing blocks 25 and 26. The arrangement of the various rolls in the lower roll assembly 42 (Fig. 4) is such that each of the intermediate rolls 51 will be in rolling contact with two adjacent pressure rolls 44 and that each of the pressure rolls 44 is contacted by two intermediate rolls 51. Further, each of the large backing up rolls 48 will be in rolling contact with two adjacent intermediate rolls 51 so that each of the intermediate rolls will be contacted by one of the backing up rolls.

The construction of the roll assembly 42 in this manner not only makes possible the use of large backing up rolls for the small pressure rolls, but has the additional advantage of reinforcing the pressure rolls at two spaced points on their peripheries which reinforcement will effectually prevent the bending or distortion of these pressure rolls while in use.

The construction of the upper roll assembly 43 is similar to that of the lower roll assembly 42 and includes similar backing up rolls 53 and intermediate rolls 54 mounted and positioned in a similar manner relative to the pressure rolls 45. This particular arrangement of the different rolls in the assembly also permits each roll to rotate without friction with the other rolls due to the fact that while all vertically adjacent rolls are in contact, all horizontally adjacent rolls are spaced from one another.

From the above, it will be seen that the roll assembly 42, together with the bearing blocks 25 and 26, will constitute a unitary structure which forms the lower half of the pressing apparatus 10 and which is preferably rigidly supported upon the piers 27 while the roll assembly 43 and bearing blocks 32 and 33 form the upper half of the pressing apparatus which is vertically movable upon the rods 36 and 37 relative to the lower half of the pressing apparatus.

In order that the oppositely disposed pressure rolls 44 and 45 will exert the desired pressure upon the sandwiches 20 as they move between the belts 18 and 19, there are provided the compression springs 55 and 56 encircling the vertical rods 36 and 37 respectively between the bosses 34 and 35 and pressure regulating nuts 57 and 58. The compression springs 55 and 56 will act to urge the bearing blocks 32 and 33 and consequently the pressure rolls 45 downwardly toward the rolls 44 to exert the necessary pressure upon the sandwiches passing therebetween. The amount of pressure exerted by the pressure rolls upon the sandwiches may be controlled by adjusting the nuts 57 and 58 and these nuts may be adjusted so as to give a differential in pressure between the springs 55 and springs 56, thus causing the pressure rolls 44 and 45 to exert progressively increasing or decreasing pressure from one end of the apparatus to the other.

The use of small pressure rolls in pairs positioned close together as described above will assist in overcoming the unequal distribution of pressure upon the sandwiches as they pass between these pairs of rolls during the pressing operation. According to the invention, however, a further equalization of pressure is attained by the use of suitable cushions or pads, which are here shown as comprising the belts 18 and 19, interposed between the pressure rolls and the sandwiches. These belts are made of a resilient compressible material which is adapted to yield to the pressure of the rolls 44 and 45 in a manner to distribute the pressure exerted thereby uniformly over the entire surface areas of the sandwiches. As clearly shown in Fig. 4, each of the belts 18 and 19 is preferably made of a two-ply laminated material, the outer or glass engaging layer *a* being of a highly resilient, compressible material such as soft rubber while the inner layer *b* is of a material which is resilient and compressible but non-stretchable such as a rubber and fabric combination. Due to this construction and arrangement, the belts 18 and 19 will act to distribute the pressure exerted by the rolls 44 and 45 uniformly throughout the surface areas of the sandwiches to provide a substantially equal pressure at all points but will not be pulled or stretched out of shape during the operation of the apparatus.

In order to convey the sandwiches to be pressed through the pressing apparatus, the belts 18 and 19 are adapted to be driven by means of the drums 22 and 29 respectively which are in turn positively driven by the chain and sprocket drives 59 and 60 respectively operatively associated with one end of the shafts 24 and 31 and connected to a suitable source of power. It is also desired that each of the rolls which comprise the roll assemblies 42 and 43 be positively driven at a peripheral speed substantially the same as the speed of the belts 18 and 19.

To this end, there is associated with the outer end of one of the stub shafts 49 of each of the backing up rolls 48 of the lower roll assembly 42 a chain and sprocket drive 61 which may be connected to the same source of power as the chain and sprocket drives 59 and 60 for the belts 18 and 19, and keyed to the shafts 49 of the rolls 48, inwardly of the chain and sprocket drive 61, are spur gears 62. One of the stub shafts 52 of each of the intermediate rolls 51 is also provided adjacent its outer end with a spur gear 63 and a similar gear 64 is keyed to the outer end of one of the stub shafts 46 of each of the pressure rolls 44.

Each of the gears 63 associated with the intermediate rolls 51 is adapted to mesh with one of the gears 62 associated with the backing up rolls 48 and with two of the gears 64 associated with the pressure rolls 44. In other words, each intermediate roll 51 has associated therewith a gear 63 which is adapted to mesh with the gear 62 and the two gears 64 which are associated with the backing up roll 48 and the pressure rolls 44 respectively with which the said intermediate roll is in rolling contact.

Since the size of the gears 62, 63 and 64 is proportionate to the size of the rolls 48, 51 and 44 respectively, it will be seen that with the arrangement described above, all of the rolls comprising the lower roll assembly 42 will be positively driven at the same peripheral speed and this speed will be substantially the same as the speed of travel of the belts 18 and 19. The rolls of the upper roll assembly 43 will be driven in the same manner by means of a chain and sprocket drive 65 associated with the rolls 53 and by the spur gears 66, 67 and 68 associated with the rolls 53, 54 and 45 respectively.

For the purpose of heating the sandwiches 20 as they pass through the pressing apparatus, the tank 12 may be filled with a suitable liquid 69 which is adapted to be heated by means of a temperature controlling medium such as steam or hot water circulated through spaced conduits 70 disposed within the liquid 69 and extending transversely of the tank 12. As shown in Fig. 1 of the drawings, the press 10 is so arranged within the tank 12 that the upper run of the lower belt 18 and the lower run of the upper belt 19 are below the level of the liquid 69 so that the sandwiches passing between the belts will be submerged in the liquid and consequently subjected to the temperature thereof.

The temperature of the sandwiches may be gradually raised by increasing the temperature of the medium circulated through the conduits 70 from the forward to the rearward end of the tank 12, and in order to more accurately control the temperature of the liquid throughout the length of the tank there is provided a series of partition walls 71 extending transversely thereof.

Although the heating means described above is the preferred form, it will be understood that various other methods may be employed for heating the sandwiches. For example, satisfactory results may be obtained by blowing heated air upon the moving belts 18 and 19.

While the pressure apparatus of the present invention is in no way restricted to use in the bonding together of any particular type of glassplastic laminations or to any particular process for so doing, it is especially well adapted for use in the manufacture of laminated safety glass which includes a sheet or layer of plastic made from the vinyl type of resin such as Formvar, Alvar, and Butylvar for the reasons explained above.

In manufacturing this type of laminated safety glass, as the sandwiches pass through the pressing apparatus, the temperature of the sandwich is gradually raised to the point necessary for bonding the laminations. As the temperature of the resin plastics is increased, their softness or flowability increases, and it is desirable to apply the maximum pressure to the sandwich as it enters the press and to then gradually decrease the pressure as the temperature increases in order to prevent flowing or extruding of the plastic and therefore pinching of the laminations around their edges.

Therefore, in pressing sandwiches including this type of plastic, the nuts 57 and 58 are adjusted to provide a gradually decreasing pressure from the forward to the rearward end of the press 10. The various laminations forming the sandwiches 20 are arranged in proper superimposed relationship and placed initially upon a conveyor 72 which moves them to the forward end of the tank 12. The sandwiches are then received upon a feeding conveyor 73 arranged within the tank and which includes a plurality of rolls which are positively driven at the same rate of speed as that of the belts 18 and 19 and so arranged that the sandwiches are first caused to move downwardly at an angle until they are immersed within the liquid 69 and then in a horizontal direction to feed them into the press 10 between the belts 18 and 19.

As the sandwiches enter the press 10 they will be at or below normal room temperature, and as the maximum pressure is exerted thereupon by the pressure rolls 44 and 45, the air and noncondensable gases will be swept from between the laminations. Then, as the sandwiches progress through the press, the temperature thereof will be gradually raised by means of the heated liquid 69 to the point necessary for bonding the laminations while the pressure upon the sandwiches will be gradually decreased. As the treated sandwiches issue from the press 10, they will be received upon a discharge conveyor 74 and caused to move first in a horizontal direction and then upwardly at an angle until they are out of the liquid 69, after which they will be discharged from the tank upon a conveyor 75.

Although only a single pressing unit 10 has been illustrated in the drawings, two or more units arranged in horizontal alignment to operate as a single pressing apparatus may be used if desired. Further, the sandwiches may also be cooled under pressure before being discharged from the apparatus if preferred.

In Fig. 5 there has been illustrated a fragmentary section of a finished sheet of laminated safety glass formed in accordance with the present invention and which includes two sheets of glass 76 and 77 and an interposed sheet of plastic material 78.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

We claim:

1. In apparatus for compositing laminated safety glass, a plurality of pairs of relatively small pressure rolls arranged relatively close to one another and between which the glass-plastic sandwiches to be pressed are adapted to be passed, cushioning means for receiving the pressure exerted by the pressure rolls and distributing said pressure over the opposite surfaces of said sandwiches, relatively large backing up rolls associated with the small pressure rolls, and intermediate rolls positioned between said backing up rolls and said pressure rolls to permit each backing up roll to back up a plurality of adjacent small pressure rolls.

2. In apparatus for compositing laminated safety glass, a plurality of pairs of relatively small pressure rolls arranged relatively close to one another and between which the glass-plastic sandwiches to be pressed are adapted to be passed, cushioning means for receiving the pressure exerted by the pressure rolls and distributing said pressure over the opposite surfaces of said sandwiches, relatively large backing up rolls associated with the small pressure rolls, and intermediate rolls positioned between said backing up rolls and said pressure rolls, each of said intermediate rolls being in rolling contact with two adjacent pressure rolls and one backing up roll.

3. In apparatus for compositing laminated safety glass, a plurality of pairs of relatively small pressure rolls arranged relatively close to one another and between which the glass-plastic sandwiches to be pressed are adapted to be passed, cushioning means for receiving the pressure exerted by the pressure rolls and distributing said pressure over the opposite surfaces of said sandwiches, relatively large backing up rolls associated with the small pressure rolls, and intermediate rolls positioned between said backing up rolls and said pressure rolls to permit each backing up roll to back up a plurality of adjacent small pressure rolls, each of said pressure rolls being contacted by two intermediate rolls.

JOHN L. DRAKE.
GEORGE B. WATKINS.